United States Patent
Messerli

[11] Patent Number: 5,974,953
[45] Date of Patent: Nov. 2, 1999

[54] KITCHEN AND TABLE-WARE FOR STEAM COOKING

[75] Inventor: Christoph Messerli, Schauffhausen, Switzerland

[73] Assignee: Sigg AG Haushaltgeräte, Frauenfeld, Switzerland

[21] Appl. No.: 09/142,111

[22] PCT Filed: Dec. 22, 1997

[86] PCT No.: PCT/CH97/00478

§ 371 Date: Sep. 1, 1998

§ 102(e) Date: Sep. 1, 1998

[87] PCT Pub. No.: WO98/29014

PCT Pub. Date: Jul. 9, 1998

[30] Foreign Application Priority Data

Jan. 2, 1997 [CH] Switzerland .................................. 3/97

[51] Int. Cl.⁶ .............................. A47J 27/04; A47J 27/12; A47J 43/24; F24D 1/00
[52] U.S. Cl. ................................ 99/340; 99/417; 99/448; 99/450; 126/20; 126/369
[58] Field of Search ...................... 99/339, 340, 403–418, 99/426, 444–446, 448–450; 126/20, 369, 369.1, 369.2, 373, 378, 388; 219/401; 220/912, 428, 408, 409; 426/418, 509–511, 523

[56] References Cited

U.S. PATENT DOCUMENTS

| | | |
|---|---|---|
| 1,375,028 | 4/1921 | Tollagsen . |
| 1,750,596 | 3/1930 | Hois ........................................ 126/369 |
| 2,040,004 | 5/1936 | Kelsay ..................................... 126/369 |
| 3,641,926 | 2/1972 | Williams et al. ......................... 99/448 |
| 4,106,486 | 8/1978 | Lee ........................................ 99/450 X |
| 4,649,811 | 3/1987 | Manganese ............................ 99/340 X |
| 4,702,160 | 10/1987 | Manganese .......................... 126/369 X |
| 5,189,947 | 3/1993 | Yim ....................................... 219/401 X |
| 5,199,347 | 4/1993 | Chen ..................................... 99/418 X |
| 5,235,904 | 8/1993 | Ludena ................................. 99/340 X |
| 5,275,094 | 1/1994 | Naft ...................................... 99/448 X |
| 5,287,798 | 2/1994 | Takeda .................................. 99/417 X |
| 5,349,898 | 9/1994 | Po Wo Cheung .................. 126/369 X |
| 5,794,525 | 8/1998 | Fan ........................................ 99/448 X |

FOREIGN PATENT DOCUMENTS

| | | |
|---|---|---|
| 9116050 | 4/1992 | Germany . |
| 9409945 | 9/1994 | Germany . |
| 29509420 | 10/1995 | Germany . |
| 19632264 | 2/1997 | Germany . |

*Primary Examiner*—Timothy Simone
*Attorney, Agent, or Firm*—Pauley Petersen Kinne & Fejer

[57] ABSTRACT

A utensil having wall elements, separate baskets for insertion therein and associated serving plates, into which the baskets can also be inserted. The wall elements have a top handling edge and a bottom edge with an indentation all round the outside so that the wall elements can be stacked together with other identical wall elements. In the vicinity of the bottom edge there is a rim on the inside of the wall elements. The associated baskets have a perforated or slotted bottom, are made from chromium-nickel steel and have a perpendicular edge with a horizontal rim. The baskets can be inserted by this edge onto a rim inside the wall elements. The baskets have two folding handle attachments for this purpose. In the separate serving plates there is a recess into which the baskets made of chromium-nickel steel can be snugly inserted.

10 Claims, 5 Drawing Sheets

KITCHEN AND TABLE-WARE FOR STEAM COOKING

BACKGROUND OF THE INVENTION

1. Field of the Invention

This invention relates to a utensil for steam-cooking and serving food.

2. Description of Prior Art

Gentle steam-cooking enhances the flavour of the food, preserves the vitamins and nutrients in the food, and reduces cooking times. But despite the fact that cooking in rising steam is very easy and beneficial, it is a technique that is usually only used by very well equipped kitchen chefs. There are, however, a number of prior art systems designed to allow the use of this healthy cooking method in private households, too. The systems in question are steam cookers including an electric evaporator and several chromium-nickel steel baskets for assembly on top of it. The flat bottom of each chromium-nickel steel basket is perforated so that the steam can rise up through the baskets. The baskets, which are round or oval in a plan view, have an approximately perpendicular side wall which is formed into a horizontal, outwardly directed edge at the top which serves for grasping the basket. The bottom edge of the basket, i.e. where the side wall runs into the flat, perforated bottom, has an indentation all round the outside so that several identical baskets can be stacked on top of each other. The evaporator unit itself has a die-cast aluminium liquid reservoir which is open at the top and an electric heating device. These elements of the evaporator are accommodated in a housing made from a thermoplastic, for example. One or several chromium-nickel steel baskets is or are then placed on top of this housing, with the topmost basket being closed by a lid. The lid is advantageously made from glass or a transparent, shock-resistant plastic so that the food in the top basket is visible. To operate the steam cooker, the liquid reservoir, which can hold about 1 to 2 litres of water, is filled and the electric heating device is then turned on. The water then evaporates slowly and the steam rises upwards through the perforated bottoms of the baskets containing the food to be cooked. A buzzer built into the evaporator emits an acoustic signal when the water boils dry and the electric heating device is switched off. As soon as the food is cooked, the baskets are removed from the evaporator and the food can then be served.

A prior art fish cooker also exists, with an additional insertable perforated bottom on which the fish is cooked. The fish cooker forms an elongated pan with a lid, and the additional bottom can be lifted in and out of the pan by means of two pivoting handling attachments. Before serving, the fish is lifted off the additional bottom and arranged on a serving plate.

One problem of the systems described above is that before serving, the food always has to be lifted out of the hot baskets and arranged on a separate serving plate, or on dinner plates. This is a delicate process because the cooked food tends to disintegrate. It also takes up valuable time, during which the food inevitably loses heat.

SUMMARY OF THE INVENTION

One object, therefore, of this invention is to provide a utensil for steam-cooking and serving, which can be used both for cooking and for serving the cooked food immediately afterwards, thereby eliminating the need to lift the food off the perforated bottom of the basket used in the steam cooker.

This task is solved by a utensil for steam-cooking and serving that is described by the features set forth in this specification and in the claims.

DESCRIPTION OF PREFERRED EMBODIMENTS

Figure 1:
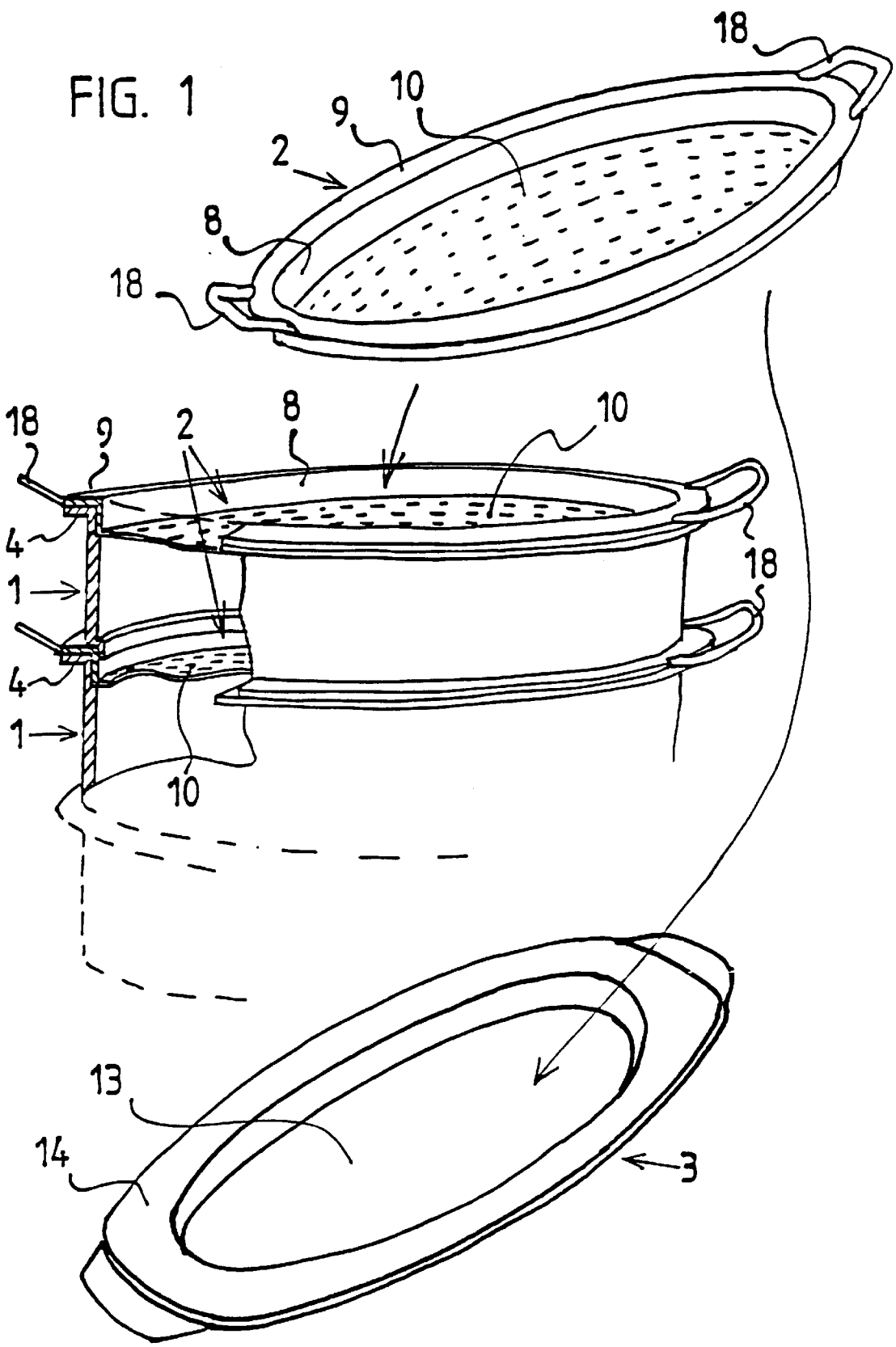
FIG. 1 shows an exploded partial section of the three different elements of an utensil for steam-cooking and serving, according to one preferred embodiment of this invention.

FIG. 1 shows the three basic elements of the utensil for steam-cooking and serving according to this invention, namely the wall elements 1, the baskets 2 with perforated or slotted bottom 10 and an associated serving plate 3. The wall elements 1, which are made from transparent, shock-resistant plastic, have an outwardly directed rim at the top which forms a handling edge 4 for the purpose of grasping the wall element 1. The bottom edge portion of the wall elements 1 has an indentation all round the outside, which is designed so that the outer dimension of the bottom edge coincides with the inner dimension of baskets 2, so that the wall elements 1 can be stacked up with the baskets 2 in-between the wall elements 1. The baskets 2 have a perpendicular edge 8, which is bent outwards horizontally at the top, thereby forming an outwardly projecting rim 9. Furthermore, baskets 2 have a perforated or slotted bottom 10. The outer dimension of baskets 2 coincides with the inner dimension of wall elements 1 in such a way that the rims 9 of the baskets 2 inserted in wall elements 1 rest snugly on top of the rims 4 of the wall elements 1. In this way a steam-tight stack can be built up from a number of alternately assembled wall elements 1 and baskets 2. The baskets 2 are advantageously made from chromium-nickel steel, because this material remains neutral with respect to the food during cooking. In the version of the baskets 2 shown here, handles 18 are disposed at two opposite points on the projecting basket rim 9.

Serving plates 3 are provided to receive the baskets 2 when not inside the utensil, and for serving. The serving plates 3 have a recess 13 in which the baskets 2 can be snugly inserted, with the rim 9 of baskets 2 lying flush with the top edge 14 of recess 13 in serving plates 3. Suitable materials for manufacturing the serving plates 3 are ceramic, an appropriate stone or plastic, or even wood.

Figure 2:
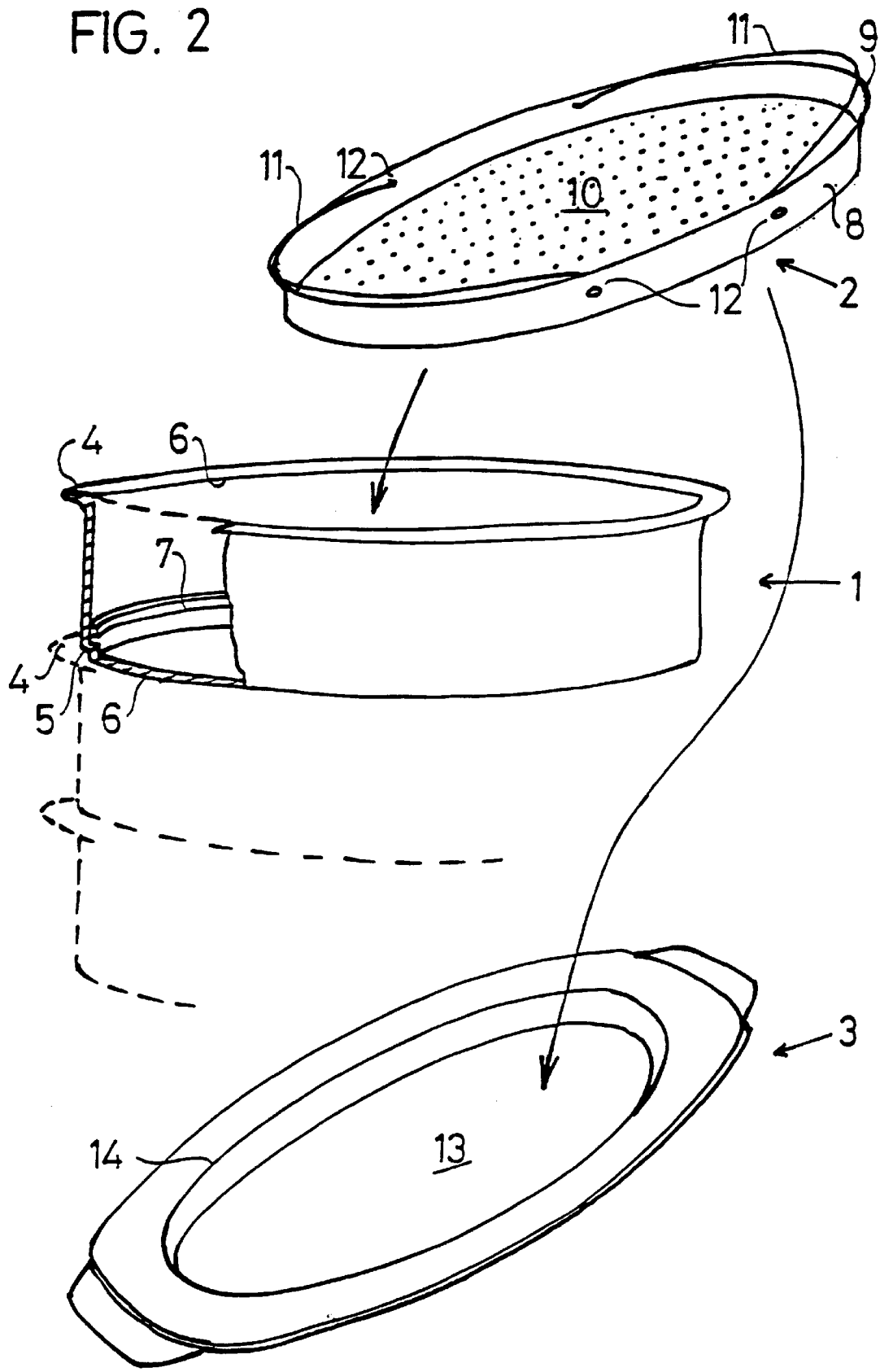
FIG. 2 shows an exploded partial section of another embodiment of the three different elements of the utensil for steam-cooking and serving.

FIG. 2 shows an alternative embodiment for the three elements of the utensil for steam-cooking and serving according to this invention. Here, the wall elements 1 made from transparent, shock-resistant plastic are bent outwards along their top edge to form a handling edge 4 which serves as a means of grasping the wall element 1. The bottom edge portion of the wall elements 1 has an indentation 5 all round the outside, which is designed so that the outer dimension of the bottom edge coincides with the inner dimension of wall elements 1, so that the wall elements 1 of the same size can be stacked up. If two or more such wall elements 1 are stacked on top of each other, then the indentation 5 of the upper wall element rests on the inside edge 6 of the handling edge 4 of the wall element 1 underneath. In the vicinity of the bottom edge of the wall element 1 there is an inside rim 7, which serves as a support for a basket 2 that can be inserted in wall element 1. Instead of a continuous rim, a rim in the form of several supporting elements projecting from the wall element could also be used. Baskets 2 have a perpendicular edge 8, which is bent horizontally outwards at the top, thereby forming an outwardly projecting rim 9. Furthermore, baskets 2 have a perforated or slotted bottom 10. The outer dimensions of baskets 2 are matched to the inner dimensions of wall elements 1 so that the rims 9 of the baskets 2 inserted in the wall elements 1 rest snugly on the rims 7 of the wall elements 1. The baskets 2 are advantageously made from chromium-nickel steel, because this material remains neutral with respect to the food during cooking. In the version of the baskets 2 shown in FIG. 2, two handle attachments 11 are pivotally disposed opposite each other at two sets of points 12 in the edge 8 of the basket 2. Once the basket 2 is inserted in a wall element 1, the handle attachments 11, which are folded down outwardly towards the edge of basket 2, run along the edge of the basket 2. As already described in connection with FIG. 1, an associated serving plate 3 is provided to receive the basket 2 when not inside the cooking utensil, and for serving.

Figure 3:
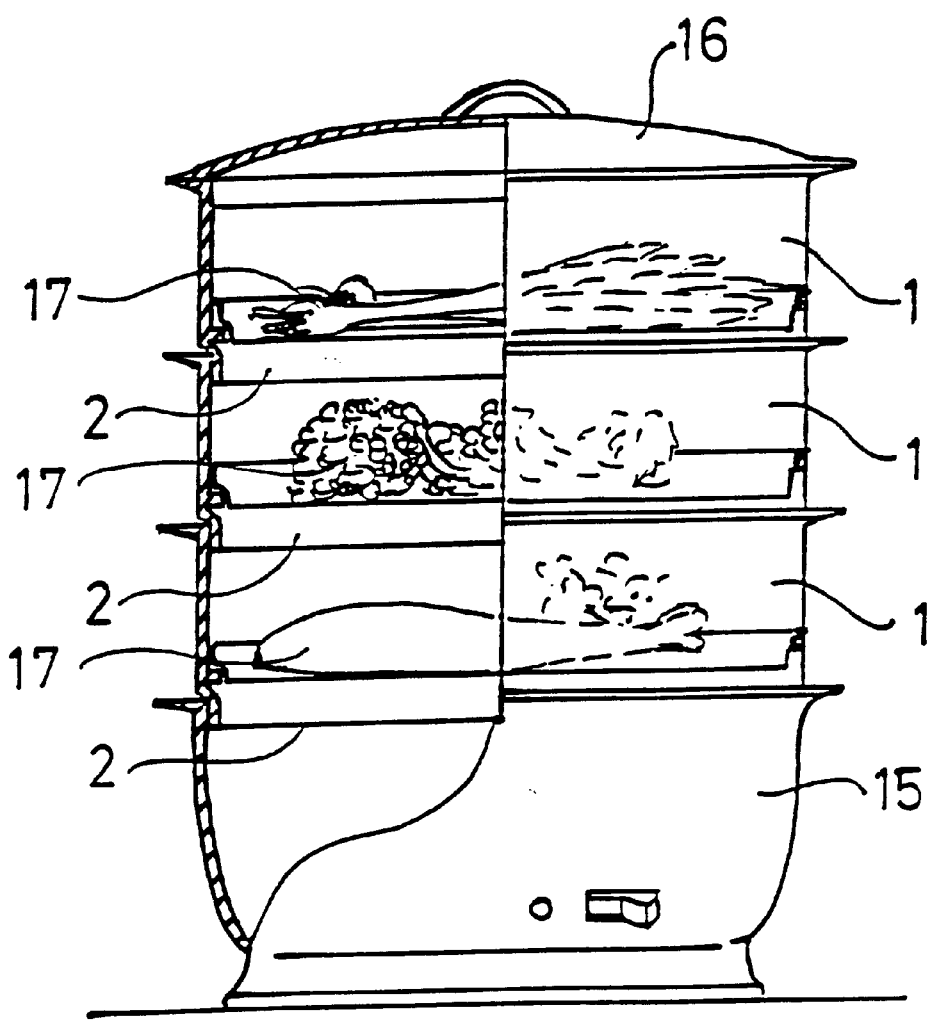
FIG. 3 shows a partial section side view of several transparent wall elements with inserted baskets, assembled on top of an evaporator in operation.

FIG. 3 shows a partial section of the embodiment of FIG. 2 of the cooking utensil in operation, shown from the side. In the example shown, the utensil comprises three transparent wall elements 1, each with an inserted basket 2. To cook different food simultaneously, the evaporator 15 is first filled with water, and the food 17 to be cooked is placed on the separate baskets 2. The baskets 2 are then placed inside the wall elements 1, and the wall elements 1 are assembled over the evaporator 15 so that they form a tower-like stack as shown here, which prevents any rising steam from escaping. A lid 16 is placed on top of the uppermost wall element 1 and the cooking process can begin. At the end of the cooking time, the wall elements 1 are lifted away from the evaporator 15 and the individual baskets 2 are lifted out and inserted in associated serving plates 3. The food is then ready to be served.

Figure 4:
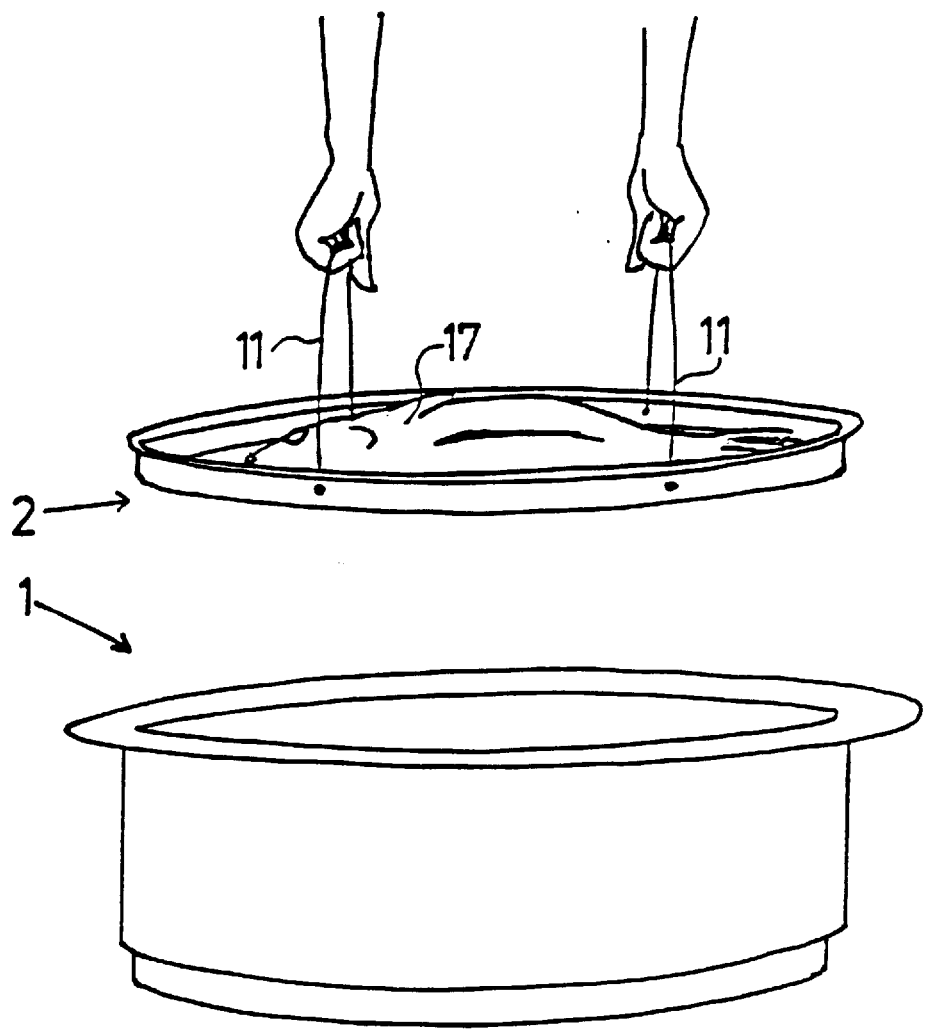
FIG. 4 shows a view of a basket being lifted out of a wall element.

FIG. 4 shows how the basket 2 can be lifted out of a wall element 1. The handle attachments 11, which are folded down horizontally during cooking, are brought up into the vertical position to extract the basket 2. Using both hands, the basket 2 with food 17 can now be lifted vertically out of the wall element 1. The basket 2 is then inserted directly into the waiting serving plate 3, which constitutes part of the utensil, and the handle attachments 11 are folded down onto the edge of the basket 2.

Figure 5:
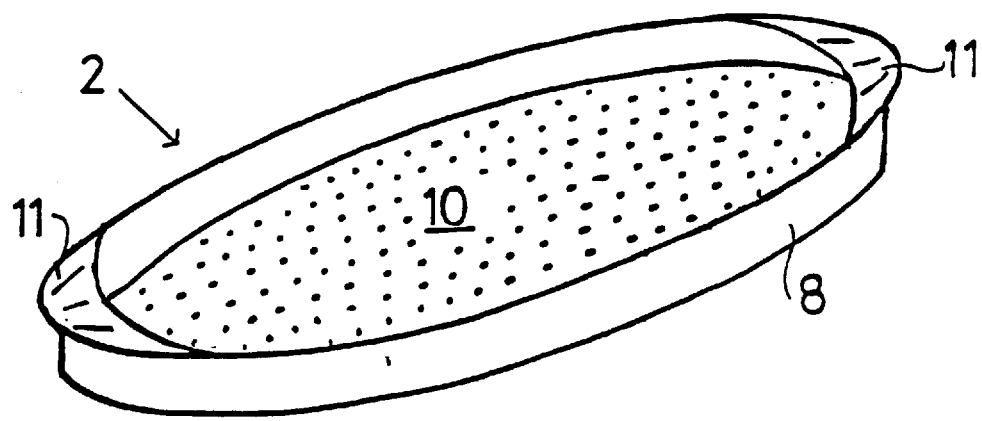
FIG. 5 shows a basket with inwardly directed handling edges.

FIG. 5 shows an alternative basket 2 for inserting into the wall elements 1. Here, the two handles 11 are each formed by an inwardly directed rim in the top edge 8 of the basket 2. It is also conceivable that, instead of the inwardly bent edge, sheet-metal strips or sheet-metal profiles could be fixed to the basket 2 in this area to form handles 11. Another way of designing the handles 11 would be to mould on arch-shaped handles rigidly connected to the top edge of basket 2, although the arches serving as the handles 11 could not be allowed to project outwards beyond the basket 2 to ensure that the basket 2 can easily be inserted into the wall elements 1.

Figure 6:
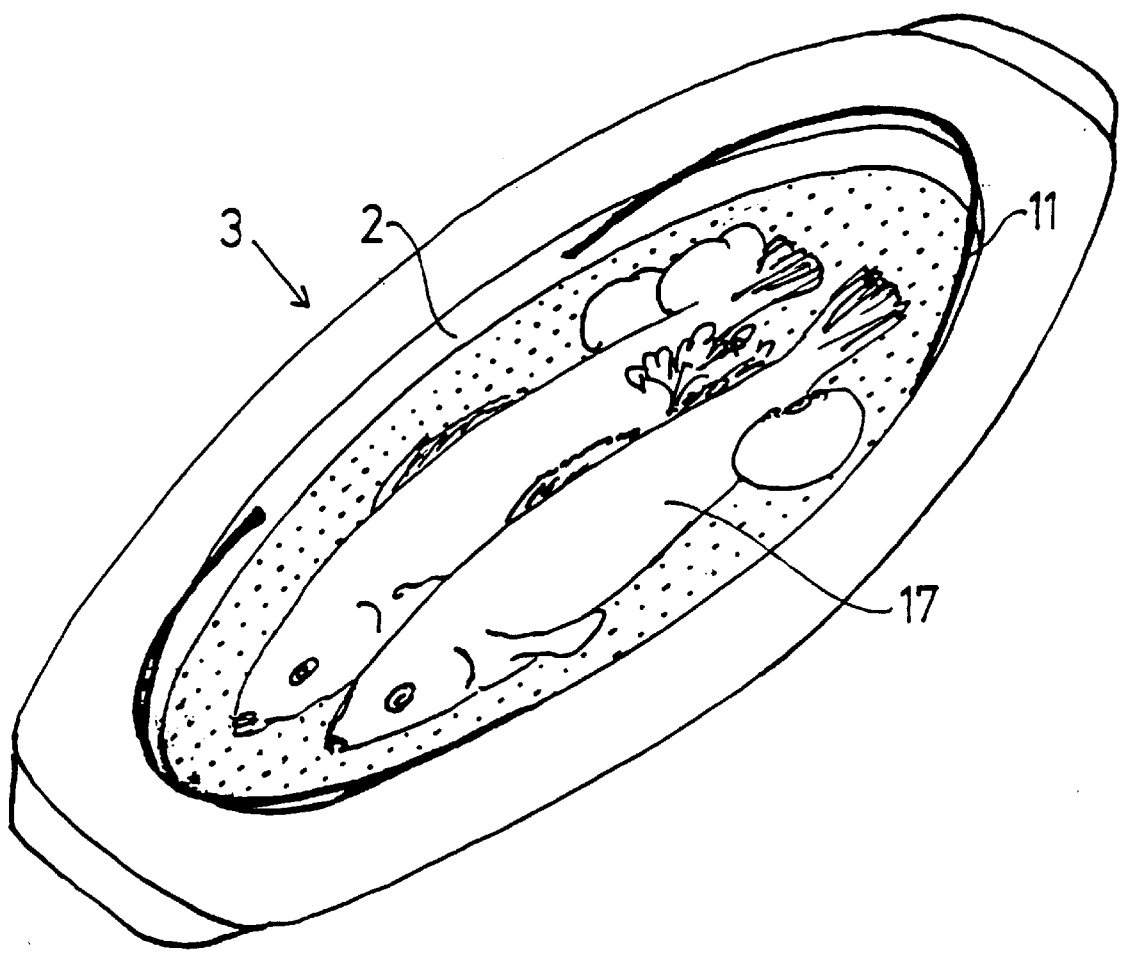
FIG. 6 shows a basket inserted in an associated serving plate.

FIG. 6 shows a serving plate 3 in which a basket 2 containing food 17 is inserted. After cooking, the food 17 does not have to be lifted out of the basket 2 and arranged on the serving plate 3, but can be positioned directly with the basket 2 inside the serving plate 3 and served immediately. Hence there is no longer any need for the troublesome lifting of cooked food from the basket bottom for subsequent arrangement on another plate. Fish in particular, for example, is relatively tricky to move about because it tends to break up during the move. With this utensil, the raw food can be arranged prior to cooking in just the way it is to be served afterwards. This saves work on the one hand, and, on the other hand, the food can be served hot and time is no longer lost in arranging the food while it inevitably cools.

I claim:

1. An utensil for steam-cooking and serving, comprising: a plurality of wall elements (1), a plurality of baskets (2) for one insertion in and assembly on the wall elements (1), each of the baskets (2) having one of a perforated and a slotted bottom (10) and a plurality of handles (11; 18) on edges of the baskets 2, the wall elements (1) being stackable one of on top of each other and in alternation with the baskets (2) and a plurality of serving plates (3) with a recess (13), wherein the baskets (2) can be snugly inserted in the serving plates (3).

2. The utensil of claim 1, wherein the baskets (2) have two of the handles (18) projecting outwardly and can be assembled snugly on a top edge of one of the wall elements (1) so that a bottom edge of each of the wall elements (1) fits snugly on one of the baskets (2) so that the alternately stacked wall elements (1) and the baskets (2) form a steam-tight stack.

3. The utensil of claim 1, wherein the wall elements (1) have a top handling edge (4) with a bottom edge indentation (5) all round an outside of the wall elements (1) so that the wall elements (1) can be stacked on top of each other, in a vicinity of the bottom edge there is a rim (7) on an inside of the wall elements (1), the baskets (2) have a horizontal rim (9) insertable in the wall elements (1) in such a way that the horizontal rim (9) rests on the rim (7) of the wall element (1), and the baskets (2) have two folding handle attachments (11).

4. The utensil of claim 3, wherein the handles (11) on the baskets (2) are pivotably disposed opposite each other at two sets of points (12) in a basket edge (8) of one of the baskets (2) so that when the one basket (2) is inserted in one of the wall elements (1), the handles (11) are folded down outwardly towards the basket edge (8) and follow a contour of the one basket (2).

5. The utensil of claim 1, wherein the wall elements (1) have a top handling edge (4) with a bottom edge indentation (5) all round an outside of the wall elements (1) so that the wall elements (1) can be stacked on top of each other, in a vicinity of the bottom edge there is a rim (7) on an inside of the wall elements (1), the baskets (2) have a horizontal rim (9) insertable in the wall elements (1) in such a way that the horizontal rim (9) rests on the rim (7) of the wall element (1), and the baskets (2) have a plurality of inwardly directed handles (11) on an edge (8) of each of the baskets (2).

6. The utensil of claim 1, wherein the wall elements (1) are made from a transparent, shock-resistant plastic and the baskets (2) and the handles (11; 18) are made from a chromium-nickel steel.

7. The utensil of claim 1, wherein the serving plates (3) are made from a ceramic material and the baskets (2) fit into the recess (13) in the serving plates (3) so that a horizontal rim (9) of each of the baskets (2) is flush with a top edge of the recess (13) in the serving plates (3).

8. The utensil of claim 1, wherein the serving plates (3) are made from wood and the baskets (2) fit into the recess (13) in the serving plates (3) so that a horizontal rim (9) of each of the baskets (2) is flush with a top edge of the recess (13) in the serving plates (3).

9. The utensil of claim 1, wherein the serving plates (3) are made from stone and the baskets (2) fit into the recess (13) in the serving plates (3) so that a horizontal rim (9) of each of the baskets (2) is flush with a top edge of the recess (13) in the serving plates (3).

10. The utensil of claim 1, wherein the serving plates (3) are made from plastic and the baskets (2) fit into the recess (13) in the serving plates (3) so that a horizontal rim (9) of each of the baskets (2) is flush with a top edge of the recess (13) in the serving plates (3).

* * * * *